United States Patent
Schneider et al.

(10) Patent No.: US 6,707,000 B2
(45) Date of Patent: Mar. 16, 2004

(54) CONSUMABLES STORAGE BOX

(75) Inventors: Joseph C. Schneider, Menasha, WI (US); Donald J. Bollerman, Waupaca, WI (US); John H. Jurasovich, Union Grove, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/290,872

(22) Filed: Nov. 8, 2002

(65) Prior Publication Data

US 2003/0062357 A1 Apr. 3, 2003

Related U.S. Application Data

(62) Division of application No. 09/939,448, filed on Aug. 24, 2001, now abandoned.

(51) Int. Cl.$^7$ .................................................. B23K 9/32
(52) U.S. Cl. ................................... 219/130.1; 219/136
(58) Field of Search ............................... 219/130.1, 133, 219/136; 220/3.5, 3.6, 476, 477, 478, 479; 312/242; 361/724, 725

(56) References Cited

U.S. PATENT DOCUMENTS

| | | |
|---|---|---|
| 2,253,403 A | 8/1941 | Steinert |
| 2,842,281 A | 7/1958 | Chisholm |
| 3,247,807 A | 4/1966 | Aversten |
| 3,504,787 A | 4/1970 | Brockway |
| 3,848,764 A | 11/1974 | Salg |
| 3,891,113 A | 6/1975 | Salg |
| 4,913,385 A | 4/1990 | Law et al. |
| 5,599,470 A | 2/1997 | Peotter et al. |
| 6,396,019 B1 * | 5/2002 | Williams .................... 219/133 |

OTHER PUBLICATIONS

Miller Electric Mfg. Co., Sprectrum Thunder and Ice 12C Torch, Owner's Manual, Jan. 2000, Miller Electric Mfg. Co., USA.
Miller Electric Mfg. Co., Spectrum 300, Owner's Manual, Apr. 2000, Miller Electric Mfg. Co., USA.
Miller Electric Mfg. Co., Sprectrum 2050, Owner's Manual, Nov. 1999, Miller Electric Mfg. Co., USA.
Hypertherm, Inc., Hyperterm Powermax 600 High Performance Portable Plasma Cutting System, Product Brochure, Sep. 1999, Hyperterm, Inc., USA.
Heyco Products, Inc., Heyco Window Plugs, Catalog Page from www.heyco.com website, 1997, Heyco Products, Inc., USA.

* cited by examiner

Primary Examiner—Clifford C. Shaw
(74) Attorney, Agent, or Firm—Ziolkowski Patent Solutions Group, LLC

(57) ABSTRACT

A storage box for welding and plasma cutting applications is disclosed. The storage box is configured to be mounted in an opening in the chassis of a welding-type power supply. The storage box is preferably secured in the opening using one or more grooves, one or two fasteners or a combination of one or more grooves and one or more fasteners.

26 Claims, 2 Drawing Sheets

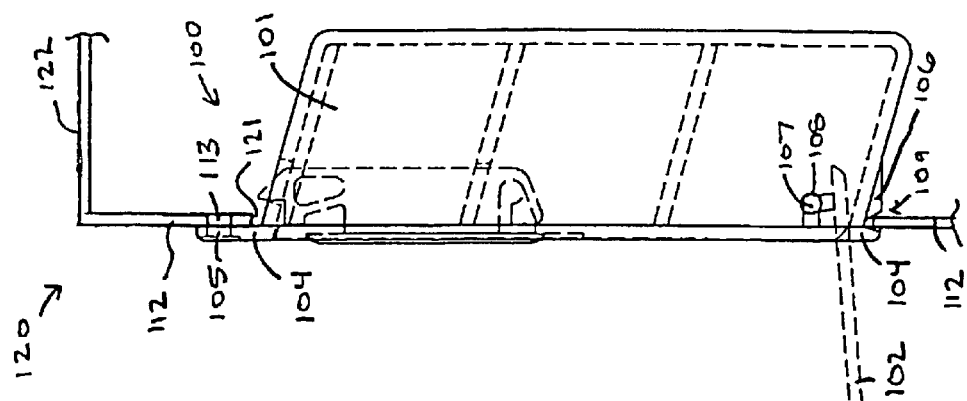
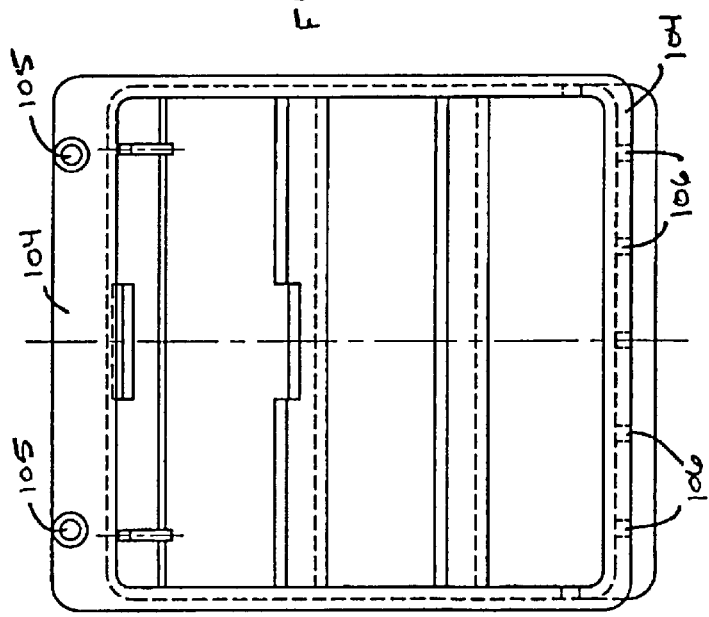

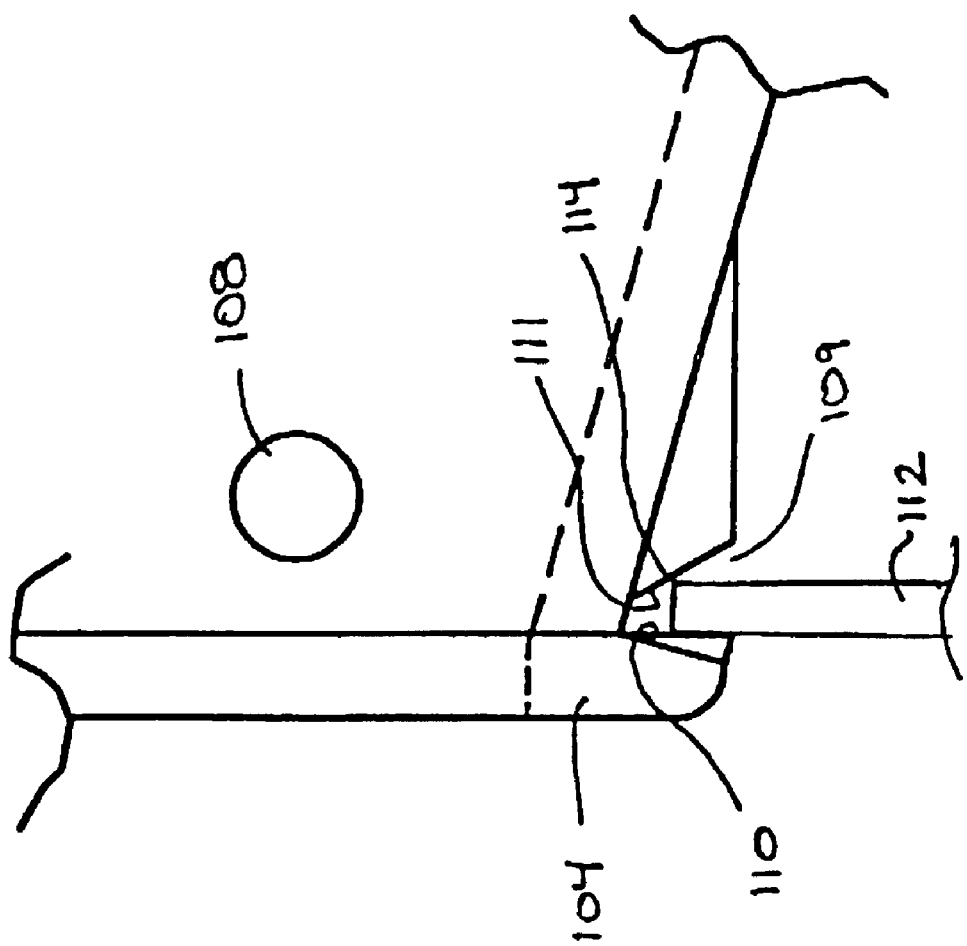

CONSUMABLES STORAGE BOX

CROSS-REFERENCE TO RELATED APPLICATION

The present application is division and claims priority of allowed U.S. patent application Ser. No. 09/939,448 file date Aug. 24, 2003 now abandoned to Schneider et al. entitled "Consumables Storage Box".

FIELD OF THE INVENTION

The present invention relates generally to storage containers for welding and plasma cutting consumables. More specifically, it relates to a method and apparatus for mounting and securing a consumable storage box in an opening in the chassis of a welding or plasma cutting power supply.

BACKGROUND OF THE INVENTION

Welding and plasma cutting typically involve the use of many different types of consumable materials and spare parts such as welding contact tips, plasma cutting tips, electrodes, etc . . . Storage boxes or containers for these consumables and parts have been included with many prior art welding power supplies and plasma cutters.

These prior art storage boxes are mounted in an opening in the sidewall of the chassis of the welding or plasma cutting machine. A flange on the front of the box is positioned adjacent to the opening either on the inside of the chassis or on the outside of the chassis. Fasteners are then inserted through mounting holes in the flange and chassis to secure the storage box in the opening.

Four holes in the storage box flange (e.g., one in each corner of the storage box assembly) must be properly aligned with four holes in the chassis in order to mount the prior art boxes in the opening. This takes time and effort on the part of the person assembling the welding or plasma cutting machine and can be especially difficult if the storage box is mounted from the inside of the chassis. It is desirable, therefore, to have a consumable storage box that can be secured into an opening in the chassis of a welding or plasma cutting power supply using less than four fasteners. Preferably no more than two fasteners are required to secure the storage box in the opening. It is also desirable to have a storage box that provides for automatic alignment of the mounting holes.

A prior art method to mount other objects, such as bushings, in chassis wall openings requires no fasteners. Instead, a flange is provided on the outside of the bushing. One or more flexible mounting tabs are located behind the flange. Grooves are formed between the flange and the mounting tabs. The flexible tabs are temporarily displaced when the bushing is pushed into the opening. This allows the chassis wall adjacent to the opening to be received in the grooves.

Prior art grooves used for this purpose have been of two types. One type is a groove having a rectangular shaped cross-section. The wall of the chassis is received in the groove. The width of the rectangular shaped groove is chosen to tightly receive the chassis wall. Tightly receiving the wall of the chassis insures that the storage container will be securely mounted in the opening without any play between the chassis wall and the storage container. The drawback to using this type of groove is that different grooves are needed to accommodate different chassis wall thicknesses.

Another type of groove has a step shaped cross sectional profile. The wall of the chassis is received in one of the steps. This type of groove, however, only provides a tight fit when used with discreet chassis wall thicknesses that are equal in width to each of the groove steps. Other chassis wall thicknesses require that a different groove be used. It is desirable, therefore, to have a storage box that includes a mounting groove which can receive any chassis wall thickness within a desired range of chassis wall thicknesses. Preferably, the groove will tightly receive any chassis wall thickness within the desired range of chassis wall thicknesses.

SUMMARY OF THE PRESENT INVENTION

According to several aspects of the invention, a storage apparatus box is configured to mount into an opening in a chassis wall of a welding-type power supply. In the first of these aspects, the box includes at least one angled notch to receive a wall of the chassis.

In other embodiments, the box includes at least one additional angled notch disposed to receive the wall of the chassis or at least one mounting hole to secure the box in the opening. The notch or notches are configured to tightly receive the wall in other embodiments. In yet another embodiment, the notch provides alignment of the mounting hole or holes with corresponding holes in the chassis when the wall is received in the notch. The angled notch is formed between a flange and a mounting tab or tabs in another embodiment.

In a second of these aspects, the box includes a groove disposed to receive any of a plurality of chassis wall thicknesses within a range of chassis wall thicknesses. The groove is configured to tightly receive the chassis wall in one embodiment.

In a third of these aspects, the box includes no more than two mounting holes. In one embodiment, the mounting holes are disposed such that they are located on the outside of the chassis. In another embodiment, the mounting holes are located on a flange disposed around the box. The box further includes a groove to receive a wall of the chassis in one embodiment. In other embodiments, the groove includes angled sidewalls or is configured to tightly receive any of a plurality of chassis wall thicknesses within a range of chassis wall thicknesses. In yet another embodiment, the groove is formed between a flange and one or more mounting tabs. The groove is disposed on the box to provide for alignment of the mounting hole or holes with corresponding holes in the chassis when the wall is received in the groove in another embodiment.

According to a fourth and fifth aspect of the invention, a method of mounting a storage box includes inserting the box into an opening in the chassis of a welding-type power supply. In one of these aspects, the method further includes securing the apparatus in the opening using no more than two fasteners. Securing the apparatus includes inserting the fasteners through mounting holes in the apparatus in one embodiment and includes receiving or tightly receiving a wall of the chassis into a groove in the apparatus in other embodiments. In the other of these aspects, the method further includes receiving or tightly receiving a wall of the chassis in an angled notch.

According to a sixth and seventh aspect of the invention, a welding apparatus includes a welding-type power supply having a chassis. A storage container is disposed in an opening in the chassis. In one of these aspects, at least one angled notch is disposed on the storage container to receive a chassis wall. In the other aspect, no more than two mounting holes are disposed on the storage container.

Other principal features and advantages of the invention will become apparent to those skilled in the art upon review of the following drawings, the detailed description and the appended claims.

BRIEF DESCRIPTION OF THE DRAWINGS

FIG. 1 shows an assembled view of a consumable storage box according to one embodiment of the present invention;

FIG. 2 shows a front view of the consumable storage box of FIG. 1 with the door removed;

FIG. 3 shows a bottom view of the consumable storage box of FIG. 1 with the door removed; and FIG. 4 shows a detailed view of the angled mounting groove of the consumable storage box of FIG. 1.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular container or box for storing welding consumables and parts having a particular configuration and particular features, the present invention is not limited to this configuration or to these features and other configurations and features can be used.

Generally, the present invention involves a storage box for welding and plasma cutting applications. The box, which includes a compartment and a door, is configured to be mounted in an opening in the chassis of a welding-type power supply. Welding-type power supply, as used herein, includes welding power supplies and plasma cutters. Box, storage box or storage container, as used herein, includes any apparatus for storing spare parts, consumables, tools, etc . . . and may be any size or shape.

The storage box is secured in the opening using one or more grooves located on the storage box, one or two fasteners (e.g., rivets, bolts, screws, clips, etc . . . ) inserted through corresponding mounting holes in the storage box or a combination of one or more grooves and one or more fasteners inserted through mounting holes. In an alternative embodiment, only grooves are used (e.g. one or more grooves) and no mounting holes are provided.

The groove or grooves receive a wall of the chassis adjacent to the opening to secure the box (or a portion of the box) in the opening. Angled groove sidewalls (e.g., v-shaped in one embodiment) allow the groove to tightly receive any of a plurality of chassis wall thicknesses within a range of chassis wall thicknesses. The mounting fasteners are inserted through mounting holes in the storage box and through corresponding holes in the chassis to secure the storage box (or a portion of the storage box) in the opening.

Received, as used herein in connection with a wall being received in a groove (or notch), includes the wall of the chassis simultaneously contacting both sidewalls of the groove (or both sidewalls of each step of the groove) after insertion of the wall into the groove. Tightly received, as used herein, includes substantially no lateral movement of a wall when it is received in a groove.

FIG. 1 shows a storage box 100 according to one embodiment of the present invention. Storage box 100 includes a compartment 101, a door 102, a latch 103, an outside flange 104, two mounting holes 105 and a plurality of mounting tabs 106. Door 102 is mounted on the front of compartment 101 using a pair of recessed hinge tabs 107. Hinge tabs 107 are received in holes 108 of compartment 101. Sliding latch 103 is provided to secure door 102 in the closed position.

Located on the bottom of storage box 100 is a mounting groove or notch 109 formed between flange 104 and each of the mounting tabs 106. Groove 109 in this embodiment includes angled sidewalls 110, 111 as is best seen in detail in FIG. 4. The angle between sidewalls 110 and 111 in one embodiment is 30 degrees. Other angles are used in other embodiments.

Angled notch (or angled groove), as used herein, includes a groove having non-parallel sidewalls and includes step grooves having one or more steps that have non-parallel sidewalls. Mounting tab, as used herein, includes any structure, flexible or rigid, on the storage container to retain the storage container in an opening in a chassis.

Storage box 100 is mounted into an opening 121 in the side of the chassis 122 of a welding-type power supply 120 in the following manner. First, the rear of storage box 100 is inserted into opening 121. As the box is inserted, a wall 112 of chassis 122 adjacent to opening 121 is received in groove 109. Because wall 112 is not parallel to angled wall 111 when received, only the inside edge 114 of wall 112 contacts angled sidewall 111 in this embodiment. As it is further received, wall 112 is wedged between the angled sidewalls 110, 111 of groove 109 providing a tight fit between the groove sidewalls 110, 111 and wall 112 of the chassis. In this way, the bottom end of storage box 100 is securely held in place in opening 121 with substantially no play or lateral movement.

One advantage to using angled notch 109 is that it allows the bottom end of the storage box to be securely mounted inside of the opening regardless of the thickness of the chassis wall. The only limitation is that the wall thickness must be less than the widest portion of angled notch 109 to be received in the notch. In other words, the range of chassis wall thicknesses that can be received is defined by the widest portion of the angled notch in this embodiment.

Another advantage to using angled notch 109 is that with the bottom end of storage box 100 secured in place, storage box 100 is properly aligned in opening 121. Thus, mounting holes 105 in the top end of box 100 are automatically aligned with mounting holes 113 in wall 112. Conventional fasteners can easily and quickly be inserted through the two pairs of aligned holes to secure the top end of box 100 to chassis 122. In this way, storage box 100 is secured in opening 121 of chassis 122 with little or no effort using no more that two fasteners.

In an alternative embodiment, no fasteners are required to mount and secure storage box 100 into the opening. In this embodiment, a second angled notch is provided on the top of box 100. The angled notch is formed between flange 104 and one or more flexible mounting tabs located on the top of the box. When the box is inserted into opening 121, wall 112 of the chassis is received in both the bottom mounting groove and the top mounting groove. The mounting tabs located on the top of the box are designed to be flexible such that they can be displaced momentarily during insertion of the box into the opening. In another embodiment, one or more angled notches are located on the sides of box 100.

Numerous modifications may be made to the present invention which still fall within the intended scope hereof. Thus, it should be apparent that there has been provided in accordance with the present invention a consumables storage box that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding apparatus comprising:
   a welding-type power supply having a chassis and a chassis wall;
   a storage container disposed in an opening in the chassis; and
   at least one angled notch disposed on the storage container to receive the chassis wall.

2. The welding apparatus of claim 1 wherein the angled notch is configured to tightly receive the chassis wall.

3. The welding apparatus of claim 1 further including at least one additional angled notch disposed on the storage container to receive the chassis wall.

4. The welding apparatus of claim 3 wherein the at least one additional angled notch is configured to tightly receive the chassis wall.

5. The welding apparatus of claim 1 further including at least one mounting hole disposed on the storage container.

6. The welding apparatus of claim 5 wherein the angled notch and the at least one mounting hole are disposed on the storage container to provide for alignment of each of the at least one mounting holes with corresponding mounting holes on the chassis when the chassis wall is received in the angled groove.

7. The welding apparatus of claim 1 further including a flange and at least one mounting tab disposed on the storage container, wherein the angled notch is formed between the flange and the at least one mounting tab.

8. The welding apparatus of claim 7 wherein the mounting holes are disposed such that when the storage container is mounted in the opening, the mounting holes are located on the outside of the chassis.

9. The welding apparatus of claim 7 further including a flange disposed around the storage container, wherein the mounting holes are disposed on the flange.

10. A welding apparatus comprising:
    a welding-type power supply having a chassis;
    a storage container disposed in an opening in the chassis;
    no more than two mounting holes disposed on the storage container; and
    wherein the storage container has a groove disposed therein to receive a wall of the chassis.

11. The welding apparatus of claim 10 wherein the groove and the no more than two mounting holes are disposed on the storage container to provide for alignment of each of the no more than two mounting holes with corresponding mounting holes on the chassis when the wall of the chassis is received in the groove.

12. The welding apparatus of claim 10 wherein the groove includes angled sidewalls.

13. The welding apparatus of claim 10 wherein the groove is configured to tightly receive any chassis wall thickness within a range or chassis wall thicknesses.

14. The welding apparatus of claim 10 further including a flange and at least one mounting tab disposed on the storage container, wherein the flange and the at least one mounting tab form the groove disposed on the storage container to receive a wall of the chassis.

15. The welding apparatus of claim 14 wherein the groove includes angled sidewalls.

16. The welding apparatus of claim 14 wherein the groove is configured to tightly receive any wall thickness within a range of wall thicknesses.

17. A welding apparatus comprising:
    a storage container configured to mount into an opening in a chassis of a welding-type power supply; and
    a groove disposed on the storage container to receive a wall of the chassis, wherein the groove is configured to receive any chassis wall thickness within a range of chassis wall thicknesses.

18. The welding apparatus of claim 17 wherein tbe groove is configured to tightly receive any chassis wall thickness within the range of chassis wall thicknesses.

19. A welding apparatus comprising:
    a storage container configured to mount into an opening in a chassis of a welding-type power supply; and
    means for receiving a wall of the chassis, wherein the means for receiving is configured to receive any chassis wall thickness within a range of chassis wall thicknesses.

20. The welding apparatus of claim 19 further including means for securing the storage container to the chassis using at least one fastener.

21. The welding apparatus of claim 19 wherein the means for receiving is configured to tightly receive the wall of the chassis.

22. A welding apparatus comprising:
    a storage container configured to mount into an opening in a chassis or a welding-type power supply;
    means for securing the storage container to the chassis using no more than two fasteners; and
    means for securing the storage container to the chassis using at least one angled notch disposed on the storage container to receive the chassis wall.

23. The welding apparatus of claim 22 further including means for receiving a wall of the chassis.

24. The welding apparatus of claim 23 wherein the means for receiving is configured to receive any chassis wall thickness within a range of chassis wall thickness.

25. The welding apparatus of claim 23 wherein the means for receiving is configured to tightly receive the wall of the chassis.

26. The welding apparatus of claim 22 further including means for aligning the apparatus in the opening of the chassis.

* * * * *

UNITED STATES PATENT AND TRADEMARK OFFICE
CERTIFICATE OF CORRECTION

PATENT NO. : 6,707,000 B2
DATED : March 16, 2004
INVENTOR(S) : Schneider et al.

It is certified that error appears in the above-identified patent and that said Letters Patent is hereby corrected as shown below:

Column 1,
Line 7, delete "2003" and substitute therefor -- 2001 --.

Signed and Sealed this

Ninth Day of November, 2004

JON W. DUDAS
*Director of the United States Patent and Trademark Office*